US011017016B2

(12) United States Patent
Yadav et al.

(10) Patent No.: US 11,017,016 B2
(45) Date of Patent: *May 25, 2021

(54) CLUSTERING PRODUCT MEDIA FILES

(71) Applicant: Adobe Inc., San Jose, CA (US)

(72) Inventors: Vikas Yadav, Noida (IN); Balaji Krishnamurthy, Noida (IN); Mausoom Sarkar, New Delhi (IN); Rajiv Mangla, New Delhi (IN); Gitesh Malik, Noida (IN)

(73) Assignee: ADOBE INC., San Jose, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 15/940,849

(22) Filed: Mar. 29, 2018

(65) Prior Publication Data

US 2018/0218009 A1  Aug. 2, 2018

Related U.S. Application Data

(63) Continuation of application No. 14/855,539, filed on Sep. 16, 2015, now Pat. No. 9,971,791.

(51) Int. Cl.
*G06F 16/58* (2019.01)
*G06F 16/583* (2019.01)
*G06F 16/783* (2019.01)

(52) U.S. Cl.
CPC ........ *G06F 16/583* (2019.01); *G06F 16/7847* (2019.01)

(58) Field of Classification Search
CPC ..................... G06F 16/583; G06F 16/7847
See application file for complete search history.

(56) References Cited

U.S. PATENT DOCUMENTS

| 6,748,111 | B1 * | 6/2004 | Stolin ................ G06K 9/00456 382/165 |
| 8,260,006 | B1 * | 9/2012 | Callari ............... G06K 9/00973 345/619 |
| 9,208,403 | B1 * | 12/2015 | Aviv ........................ G06T 7/13 |
| 9,424,461 | B1 * | 8/2016 | Yuan .................. G06K 9/00201 |

(Continued)

OTHER PUBLICATIONS

U.S. Appl. No. 14/855,539, filed Sep. 7, 2017, Preinterview 1st Office Action.

(Continued)

*Primary Examiner* — Kris E Mackes
*Assistant Examiner* — Tiffany Thuy Bui
(74) *Attorney, Agent, or Firm* — Keller Jolley Preece

(57) ABSTRACT

A method for clustering product media files is provided. The method includes dividing each media file corresponding to one or more products into a plurality of tiles. The media file include one of an image or a video. Feature vectors are computed for each tile of each media file. One or more patch clusters are generated using the plurality of tiles. Each patch cluster includes tiles having feature vectors similar to each other. The feature vectors of each media file are compared with feature vectors of each patch cluster. Based on comparison, product groups are then generated. All media files having comparison output similar to each other are grouped into one product group. Each product group includes one or more media files for one product. Apparatus for substantially performing the method as described herein is also provided.

20 Claims, 9 Drawing Sheets

(56) References Cited

U.S. PATENT DOCUMENTS

| | | | |
|---|---|---|---|
| 2002/0016787 A1* | 2/2002 | Kanno | G06F 16/30 |
| 2005/0100319 A1 | 5/2005 | Saed | |
| 2006/0140494 A1* | 6/2006 | Ishikawa | H04N 19/64 |
| | | | 382/239 |
| 2007/0156379 A1* | 7/2007 | Kulkarni | G06F 30/30 |
| | | | 703/14 |
| 2008/0037877 A1* | 2/2008 | Jia | G06F 16/583 |
| | | | 382/224 |
| 2011/0249863 A1 | 10/2011 | Ohashi et al. | |
| 2012/0183073 A1* | 7/2012 | Milstein | H04N 19/63 |
| | | | 375/240.19 |
| 2014/0114985 A1* | 4/2014 | Mok | G06F 16/44 |
| | | | 707/748 |
| 2014/0341306 A1* | 11/2014 | Hendry | H04N 19/174 |
| | | | 375/240.26 |
| 2015/0170245 A1* | 6/2015 | Scoglio | G06Q 30/0623 |
| | | | 705/14.55 |
| 2015/0319442 A1 | 11/2015 | Puri | |
| 2015/0370830 A1 | 12/2015 | Murphy-Chutorian et al. | |
| 2016/0165309 A1* | 6/2016 | Van Brandenburg | H04N 21/26283 |
| | | | 725/116 |
| 2016/0225053 A1* | 8/2016 | Romley | G06Q 30/0623 |
| 2016/0292510 A1 | 10/2016 | Han et al. | |
| 2017/0024614 A1 | 1/2017 | Sanil et al. | |
| 2017/0075977 A1 | 3/2017 | Yadav et al. | |
| 2017/0185675 A1* | 6/2017 | Arngren | G06K 9/00744 |

OTHER PUBLICATIONS

U.S. Appl. No. 14/855,539, filed Oct. 30, 2017, 1st Action Office Action.
U.S. Appl. No. 14/855,539, filed Feb. 15, 2018, Notice of Allowance.

* cited by examiner

CLUSTERING PRODUCT MEDIA FILES

CROSS REFERENCE TO RELATED APPLICATIONS

The present application is a continuation of U.S. application Ser. No. 14/855,539, filed Sep. 16, 2015, issued as U.S. Pat. No. 9,971,791. The aforementioned application is hereby incorporated by reference in its entirety.

BACKGROUND

In electronic commerce (ecommerce) industry, a visitor visits a website of a company that offers ecommerce services, searches for a product and then views product media files, such as images or videos of the product, before making a purchase decision. Hence, it is a fundamental requirement of the ecommerce companies to provide rich engaging experience, such as spin views, pan, zoom views etc., for the product media files to the visitor.

In order to provide rich engaging experience, the ecommerce companies hire photo shoot companies or use in-house photo shoot team to conduct a photo shoot of the product. The photo shoot team generates several photos or videos of the product from one or more angles. Similar photo shoots are conducted for hundreds or thousands of products. The photo shoot team then provides the photos or videos to the ecommerce company that ordered the photo shoot. Finally, all photos or videos of a particular product are grouped by the ecommerce company to generate one product group for each product.

However, there is an unmet need for clustering product media files and associating each product group with corresponding product name in an efficient manner.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for clustering product media files is provided. The method includes dividing each media file corresponding to one or more products into a plurality of tiles. The media file include one of an image or a video. Feature vectors are computed for each tile of each media file. One or more patch clusters are generated using the plurality of tiles. Each patch cluster includes tiles having feature vectors similar to each other. The feature vectors of each media file are compared with feature vectors of each patch cluster. Based on comparison, product groups are then generated. All media files having comparison output similar to each other are grouped into one product group. Each product group includes one or more media files for one product.

Apparatus for substantially performing the method as described herein is also provided.

Figure 1:
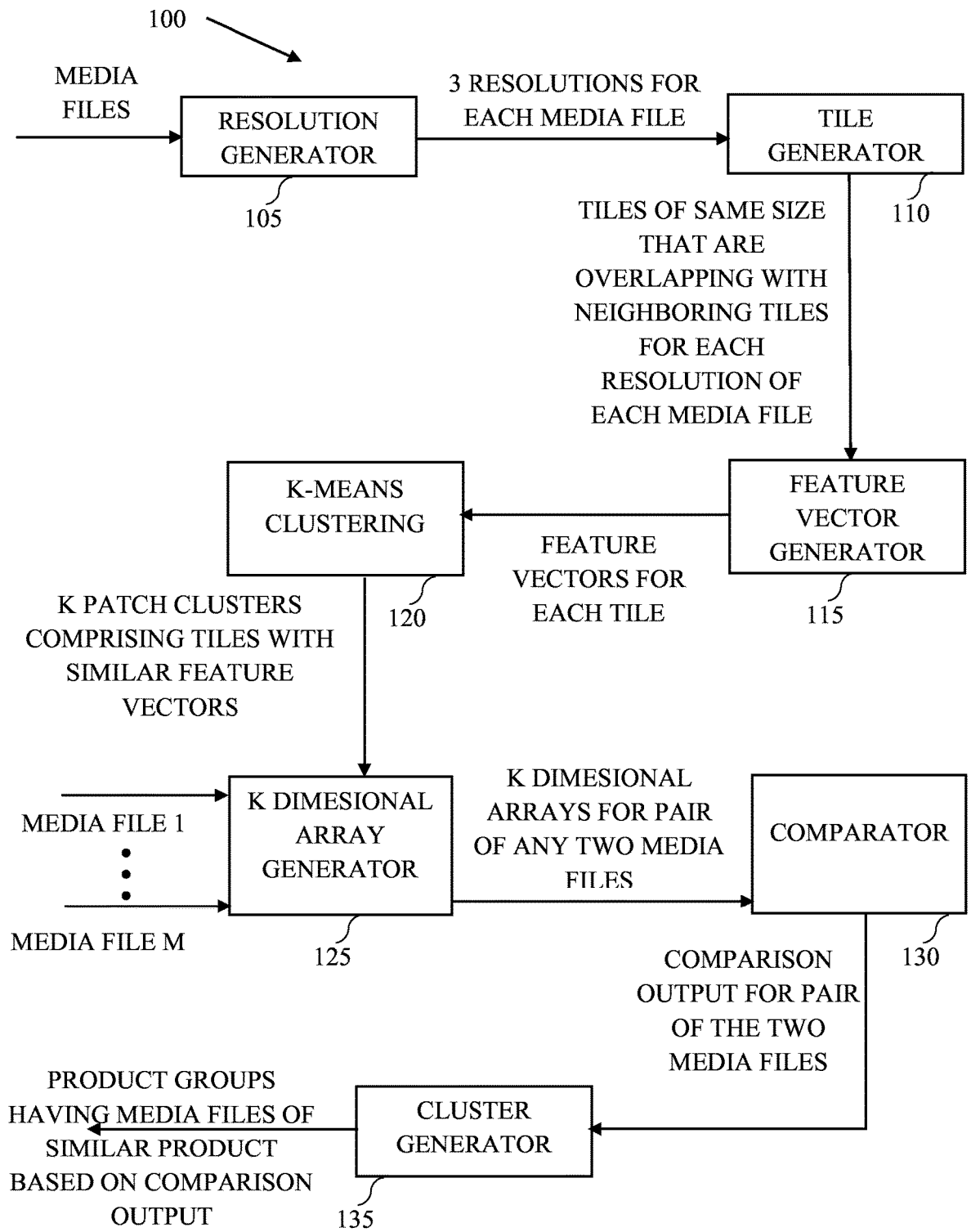
FIG. 1 is a diagram of an apparatus for clustering media files, according to one embodiment.

While the procedure and apparatus is described herein by way of example for several embodiments and illustrative drawings, those skilled in the art will recognize that the procedure and apparatus provided herein is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the procedure and apparatus. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Moreover, although the terms "step" and/or "block" are used herein to connote different elements of procedures employed, the terms should not be interpreted as implying any particular order among or between various steps herein disclosed unless and except when the order of individual steps is explicitly described.

DETAILED DESCRIPTION OF EMBODIMENTS

Overview

Often, it is a requirement of a marketer or a sales person or a category manager or any other appropriate person of a company to provide rich engaging experience, such as spin views, pan, zoom views etc., for product media files (such as images, photos, videos etc.) to a visitor. In order to provide rich engaging experience, the company hires photo shoot companies or use in-house photo shoot team to conduct a photo shoot of the product. The photo shoot team generates several photos or videos of the product from one or more angles. Similar photo shoots are conducted for hundreds or thousands of products. The photo shoot team then provides the photos or videos to the company that ordered the photo shoot. Finally, all photos or videos of a particular product are grouped by the ecommerce company to generate one product group for each product. However, current processes for grouping photos or video for each product are manual and cumbersome. The problem worsens with increasing number of products. Hence, an efficient procedure for clustering product media files to automatically generate product groups is required.

Currently, the techniques of clustering photos or videos for each product are manual and cumbersome. One technique includes hiring a dedicated team by the ecommerce company for clustering purpose. The dedicated team receives the photos or videos from the photo shoot team and manually generates one product group per product by going through hundreds or thousands of photos or videos. Such technique is time consuming and inefficient, and hampers the operation of ecommerce company as time to market is key in today's cut throat world. Another technique includes imposing a requirement on the photo shoot team to follow a file naming convention specified by the ecommerce company for the photos or videos. Such technique poses a burden on the photo shoot team to rename each and every photo or video as per the file naming convention, and hence is time consuming and inefficient. Similar problem of following the file naming convention as specified by the ecommerce company or manually generating one product group for each product is also faced by retailers while uploading product catalogs on the website of the ecommerce company.

Further, in current solutions, once one product group is generated for each product the product group is associated with that product name and this is also done manually.

In accordance to embodiments of the present invention and as described in more detail below, a procedure for clustering product media files is provided. A marketer logs into a tool, such as ADOBE EXPERIENCE MANAGER, and accesses workflows to create a rich engaging experience for a product. The marketer creates or uploads the product shot list. The shot list includes details such as product name, description of the product, category of the product, and other details associated with the product. The shot list is accessed by an in-house photo shoot team or an external photo shoot company who is entrusted with the responsibility of conducting photo shoot of the product. The media files, such as photos, images or videos clicked during the photo shoot, are then uploaded and made accessible to the tool. In one embodiment, the media files are uploaded independent of any naming convention to be used for clustering and independent of any naming convention as specified by the marketer of the company. The tool automatically, as described below, processes the uploaded media files through deep learning techniques to cluster the media files into one or more product groups. Each product group corresponds to one product and includes all media files for that product. In addition, a label is also generated for the product group automatically.

The tool accesses the media files corresponding to one or more products mentioned in the shot list. If the media file is an image then entire image is processed. If the media file is a video then frame wise processing of the video is performed. A plurality of resolutions of each frame of the video or each image is generated. Each resolution is divided into a plurality of tiles, which in one embodiment, overlap with at least one other tile. A tile, as used herein, is a small portion of a frame or an image, where each frame or image includes two or more tiles, typically of equal size.

Each tile is processed using a deep learning technique to compute feature vectors of each tile. As used herein, a feature vector is an n-dimensional vector of numerical features that represent a product or attribute or property of a product, such as a product in a media file or in a tile of the media file. Various features of the product in each tile, including color components, length, area, shape description, gradient magnitude, or gradient direction, are numerically represented by the computed feature vector. Various features of the model who is wearing the product in each tile, including orientation, posture etc., are also numerically represented by the computed feature vector. The deep learning technique is machine learning technique performed using a neural network, such as a deep convolutional neural network (network), that has been pre-trained on a large class of media files. The network is used to obtain feature vectors representing content of each tile through, in one embodiment, the response of the fully connected layer two levels below the final Softmax classification layer. In one embodiment, a Softmax function is applied to the network for classification, and such determines whether the output of the network indicates that a particular tile being evaluated has certain features.

The feature vectors of all tiles are then processed using a clustering technique, for example the K-means clustering or any other technique such as neural gas, hierarchical clustering etc., to group all tiles having similar feature vectors into one patch cluster. Several patch clusters are generated, wherein each patch cluster includes all tiles having feature vectors similar to each other. The tiles within a patch cluster can be from different media files. The number of patch clusters are configurable and the clustering technique can be fine-tuned to generate desired number of patch clusters. The tiles present in a patch cluster need not have exactly similar feature vectors but feature vectors with a similarity score or value greater than a predefined similarity threshold. The fine-tuning is performed by varying the similarity threshold. The similarity score or value is indicative of closeness in distance between a feature vector of a tile and a feature vector of another tile. The similarity threshold is used as an indicator of similarity among products or attributes of the product present in different tiles. Higher the similarity threshold more specific (or similar) the attributes or properties in the patch clusters are. Each patch cluster indicates properties or attributes of the products present in the tiles in that patch cluster. Each patch cluster includes tiles of one or more media files. The patch cluster indicates number of media files contributing to that patch cluster.

The feature vectors of each media file are then compared with feature vectors of each patch cluster. The feature vectors for a patch cluster is union of feature vectors of all tiles included in the patch cluster. In one embodiment, comparing the feature vectors of each media file with each patch cluster includes generating an array for each media file. The array includes K entries if K patch clusters are formed. Each entry in the array corresponds to one patch cluster and indicates probability of the media file having feature vectors similar to the feature vectors of corresponding patch cluster. Similar feature vectors indicate that the product or the property or the attribute of the product indicated by the patch cluster is present in the media file. In other words, the array indicates membership of tiles of the media file in various patch clusters. One array is generated for each media file. In one embodiment, the array is a binary array having value 1 corresponding to patch cluster "P2" if the feature vectors of the media file matches feature vectors of the patch cluster "P2" and a value of 0 corresponding to patch cluster "P3" if the feature vectors of the media file does not match feature vectors for the patch cluster "P3". Similarly, a probability value of either 0 or 1 is populated in the array corresponding to each patch cluster. In another embodiment, the array is non-binary array including probability or numerical or decimal values corresponding to each patch cluster and indicative of similarity of feature vectors of the media file with feature vectors of corresponding patch cluster.

The arrays are then compared. Based on comparison, product groups are generated. All media files having comparison output, i.e. the array, similar to each other are grouped into one product group. Similarity in arrays indicate that the media files correspond to same product and have same set of properties or attributes as that indicated by a patch cluster for same set of patch clusters. In one embodiment, all arrays having values corresponding to all or a pre-defined number of patch clusters as 0 can be discarded. In another embodiment, all arrays having at least a minimum number of values as 1 are considered and rest of the arrays are discarded.

Advantageously, usage of configurable patch clusters helps in generating accurate product groups. The similarity threshold can be increased to provide more accurate results and filter out false or inaccurate results. Higher the similarity threshold higher the number of patch clusters and hence, higher the level of differences, i.e. higher accuracy, in final product groups. A direct comparison of feature vectors of media file with feature vectors of another media file gives faulty results. For example, if one media file includes a model wearing a t-shirt with round neck and another media file includes the same model in same posture and same orientation wearing exactly same t-shirt but with a V-neck then the direct comparison is not able to differentiate between the two media files. However, formation of configurable patch clusters enable identifying such differences, i.e. V-neck vs. round neck, and clustering the two media files into two different product groups because the patch clusters determine similarity among the images at a more granular level, i.e. tiles, rather than entire image.

Also, automatic generation of product groups reduces burden on the photo shoot team and the marketer, and saves time. In addition, in some embodiments, keywords are also generated for each patch cluster by processing the tiles of that patch cluster through deep learning technique. The keywords of all patch clusters whose feature vectors are present in the product group are then collated and compared with the keywords included in the shot list (list) of the product. The keywords that match the keywords present in the shot list of the product are then used to label the product group. The shot list includes not just the names of the products but other details such as one or more of textual description, tags or metadata.

Terms Definitions (In Addition to Plain and Dictionary Meaning of The Terms)

A "media file" is a file created during the photo shoot of a product. The media file can be an image, photo or a video. The image can include a model wearing the product. For example, the image can include a man wearing a shirt, i.e. the product.

A "tile" is a small portion of a frame of a video or an image. The tiles are generated using any existing technique. In some embodiments, the tiles are square shaped tiles with N*N dimension. In other embodiments, the tiles can be non-rectangular regions and can be of any shape or size. Each frame or image, typically, includes two or more tiles of equal size. In some embodiments, the neighboring tiles overlap each other.

A "feature vector" is an n-dimensional vector of numerical features that represent a product or attribute or property of a product, such as a product in a media file or in a tile of the media file. Each tile is processed through a deep learning technique to determine feature vectors for the tile. Various features of the product in each tile, including color components, length, area, shape description, gradient magnitude, or gradient direction, are numerically represented by the computed feature vector. Various features of the model who is wearing the product in each tile, including orientation, posture etc., are also numerically represented by the computed feature vector. The deep learning technique is machine learning technique performed using a neural network, such as a deep convolutional neural network (network), that has been pre-trained on a large class of media files. The network is used to obtain feature vectors representing content of each tile through, in one embodiment, the response of the fully connected layer two levels below the final Softmax classification layer. In one embodiment, a Softmax function is applied to the network for classification, and such determines whether the output of the network indicates that a particular tile being evaluated has certain features.

A "patch cluster" is a group or cluster of one or more tiles. All tiles having similar feature vectors are grouped into one patch cluster. The patch cluster includes tiles from one or more media files at one or more resolution. Each patch cluster indicate properties or attributes specific to that patch cluster. For example, one patch cluster can correspond to leg of a model and includes properties or feature vectors corresponding to the leg. Another patch cluster can indicate color properties of a shirt in one or more media files. Yet another patch cluster can be specific to orientation and posture of a model present in one or more media files. In one embodiment, the patch clusters are generated by processing various tiles through K-means algorithm. The patch clusters indicate common patches, i.e. properties or attributes, which are present across different media files.

A "product group" is a group of one or more media files corresponding to same product. The product group is generated based on comparison of feature vectors of each media file with feature vectors of each patch cluster. Comparing includes generating an array for each media file, wherein the array indicates presence of feature vectors of some patch clusters in the media file and absence of feature vectors of certain patch clusters in the media file. The array includes K number of entries if K patch clusters are used, wherein each value corresponds to one patch cluster. The value is indicative of feature vectors of corresponding patch cluster being present or absent in the media file. For example, a value of "0" corresponding to a patch cluster "P2" indicates that the media file does not have feature vectors similar to patch cluster "P2". If the patch cluster "P2" indicates posture and orientation of the model then the value of "0" indicates that the media file does not include the corresponding model. Similarly, a value of "1" corresponding to a patch cluster "P4" indicates that the media file has feature vectors similar to patch cluster "P4". If the patch cluster P4 indicates portion of a shirt, i.e. the product then the value of "1" indicates that the media file includes the portion of the shirt and is a likely candidate, based on values corresponding to other patch clusters in the array, for clustering into the product group of the shirt.

A "marketer" or a "sales manager" or a "category manager" is an entity or a person who manages the account of a company with a tool, such as Adobe Experience Manager, or who has authority to do so. The marketer can be any personnel who is tasked with managing the account. Examples of managing the account includes creating a shot list, providing the shot list to photo shoot team, obtaining media files from the photo shoot team, and ensuring that the media files are clustered appropriately to generate one product group for each product.

A "user" or a "visitor" is an entity or a person who visits a website of a company, searches for a product and then views product media files, such as images or videos of the product, before making a purchase decision.

In the following discussion, an "Example Apparatus" is first described that is operable to employ procedures described herein. Following this, a section entitled "Example Procedures" describes some example procedures in accordance with one or more embodiments and a section entitled "Example Environment" describes environment that includes the apparatus described herein.

It will be appreciated that the description includes mention of three resolutions and K-means algorithm or K-mean clustering element just as a way of example, and any number of resolutions and any alternative clustering technique or clustering element can be used.

Example Apparatus

FIG. 1A is a diagram of an apparatus 100 for clustering media files, according to one or more embodiments. The apparatus 100 is any computing device that is capable of performing various functions described herein. In one embodiment, the apparatus 100 is a server powered by Adobe Experience Manager. One or more apparatuses 100 may be utilized to carry out embodiments described herein. Each apparatus 100 is capable of accessing the Internet, such as the World Wide Web. The apparatus 100 takes on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device. Further, the apparatus 100 includes one or more processors, and one or more computer-readable media. The computer-readable media may include computer-readable instructions executable by the one or more processors.

The apparatus 100 is used to carry out various portions or steps of a procedure to cluster media files, and as such, these apparatuses 100 may operate in parallel. In other embodiments, multiple apparatuses 100 may each perform the same steps. As further described herein, the apparatus 100 includes memory and processors to cluster media files. The one or more processors further includes multiple elements to perform various portions of the procedure.

The apparatus 100 includes a resolution generator 105 that accesses one or more media files from a database. The media files include images, videos or a combination thereof of a product. The media files are received from a photo shoot team, by way of uploading on a website, and are stored in the database present in a storage medium, such as the storage device 916. The media files include a product and in addition, may include models wearing or associated with the product. The media files are processed by the resolution generator 105 to generate multiple resolutions for each media file. In one embodiment, three resolutions are generated for each media file. If the media file is an image then three resolutions are generated for the image. If the media file is a video then frame wise processing of the video is performed and three resolutions are generated for each frame of the video. The resolution generator uses any existing technique to generate different resolutions for each media file.

Figure 4:
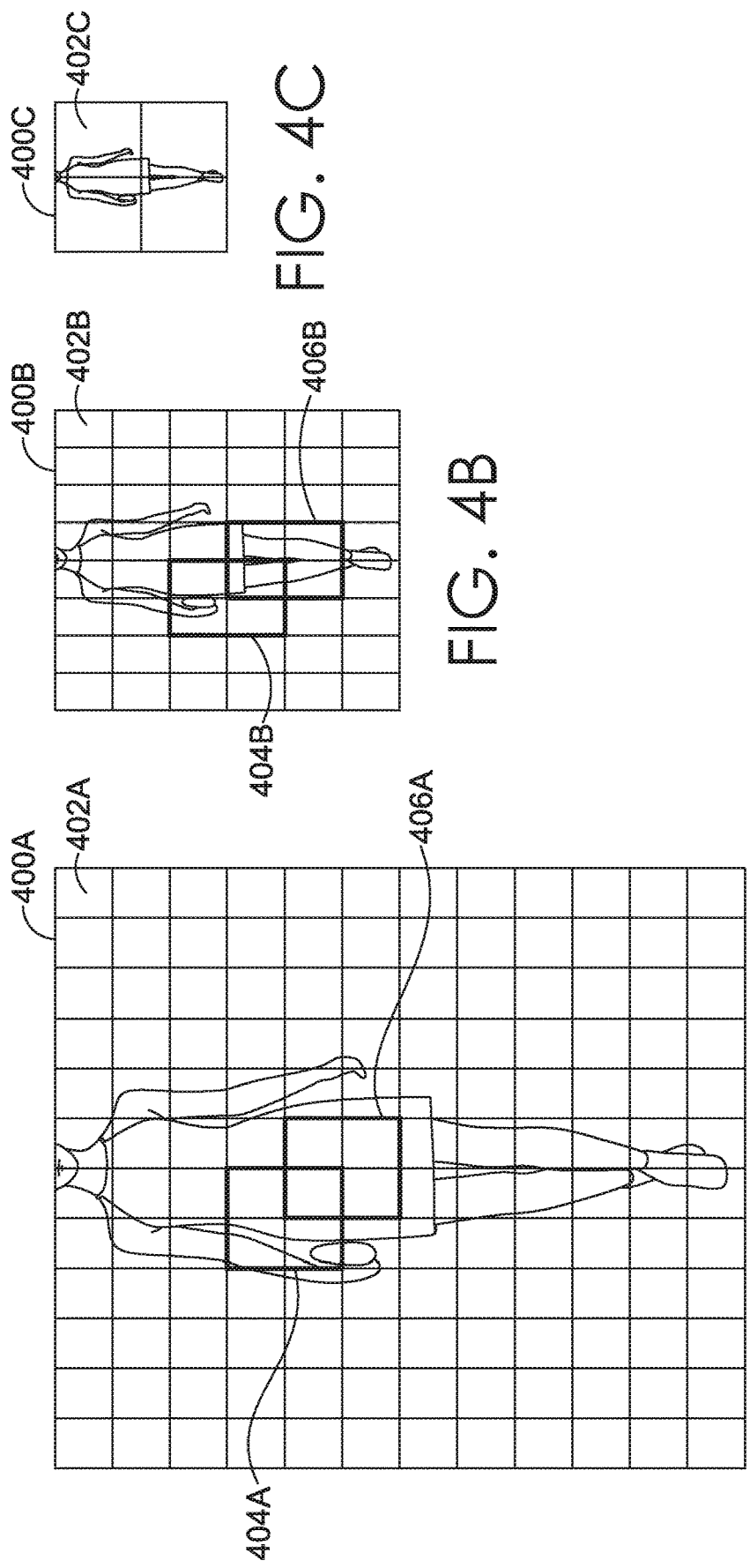
FIGS. 4A, 4B, and 4C is a diagram depicting exemplary frames of a media file at different resolutions, according to one or more embodiments.

A tile generator 110 receives the different resolutions of each media file and generates one or more tiles for each resolution of each media file. The tile generator uses any existing technique to generate tiles for each resolution. In one embodiment, tiles of same size, i.e. W*W, are generated for each resolution of each media file. The neighboring tiles are overlapping with each other. An exemplary but non-limiting tile size is 250×250 pixels, but the tiles could be of many different sizes or shapes such as non-rectangular shapes FIGS. 4A, 4B, and 4C illustrate exemplary media file having different resolutions. For instance, FIG. 4A illustrates a media file at resolution 400A which is the highest resolution, and thus is divided into the most tiles. For example, tile 402A is an individual tile. In combination or in addition to individual tiles, such as tile 402A, tiles may overlap with other tiles, such as tiles 404A and 406A. Similarly, in FIG. 4B, resolution 400B has a resolution lower than the resolution 400A, and includes individual tile 402B, along with tiles 404B and 406B that are shown as overlapping one another. FIG. 4C illustrates a resolution 400C having a resolution that is lower than the resolution 400A and the resolution 400B. The resolution 400C includes several individual tiles, including tile 402C.

A feature vector generator 115 accesses each tile of each media file and processes the tiles to generate feature vector for each tile. In one embodiment, the feature vector is computed or generated using deep learning technique. The deep learning technique is a machine learning technique performed using a neural network, such as a deep convolutional neural network (network) that has been pre-trained on a large class of media files. The network is used to obtain feature vectors representing content of each tile through, in one embodiment, the response of the fully connected layer two levels below the final Softmax classification layer. In one embodiment, a Softmax function is applied to the network for classification, and such determines whether the output of the network indicates that a particular tile being evaluated has certain features.

Figure 5:
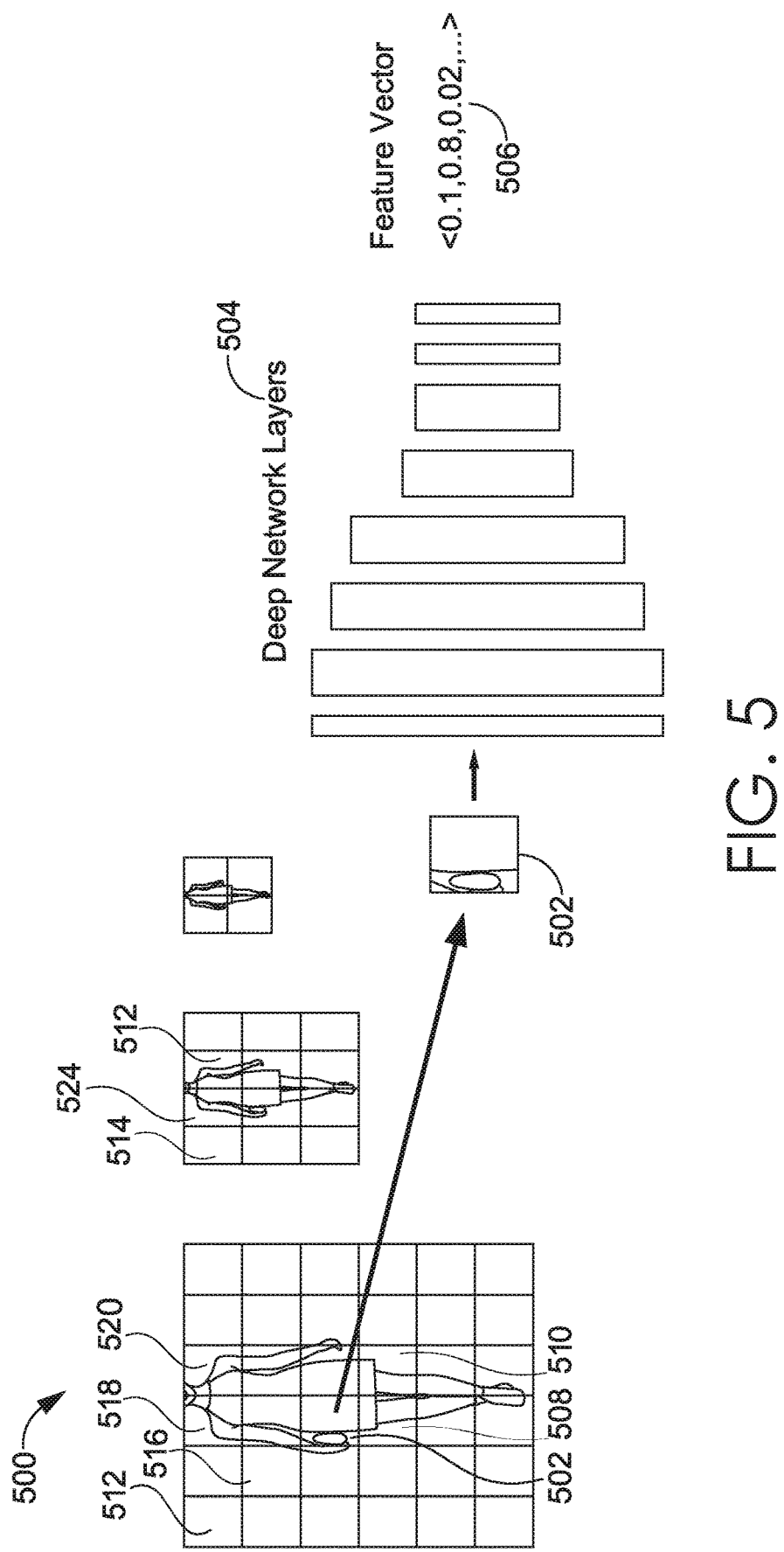
FIG. 5 is a diagram depicting a computation of a feature vector of a tile of a media file, according to one or more embodiments.
Figure 6:
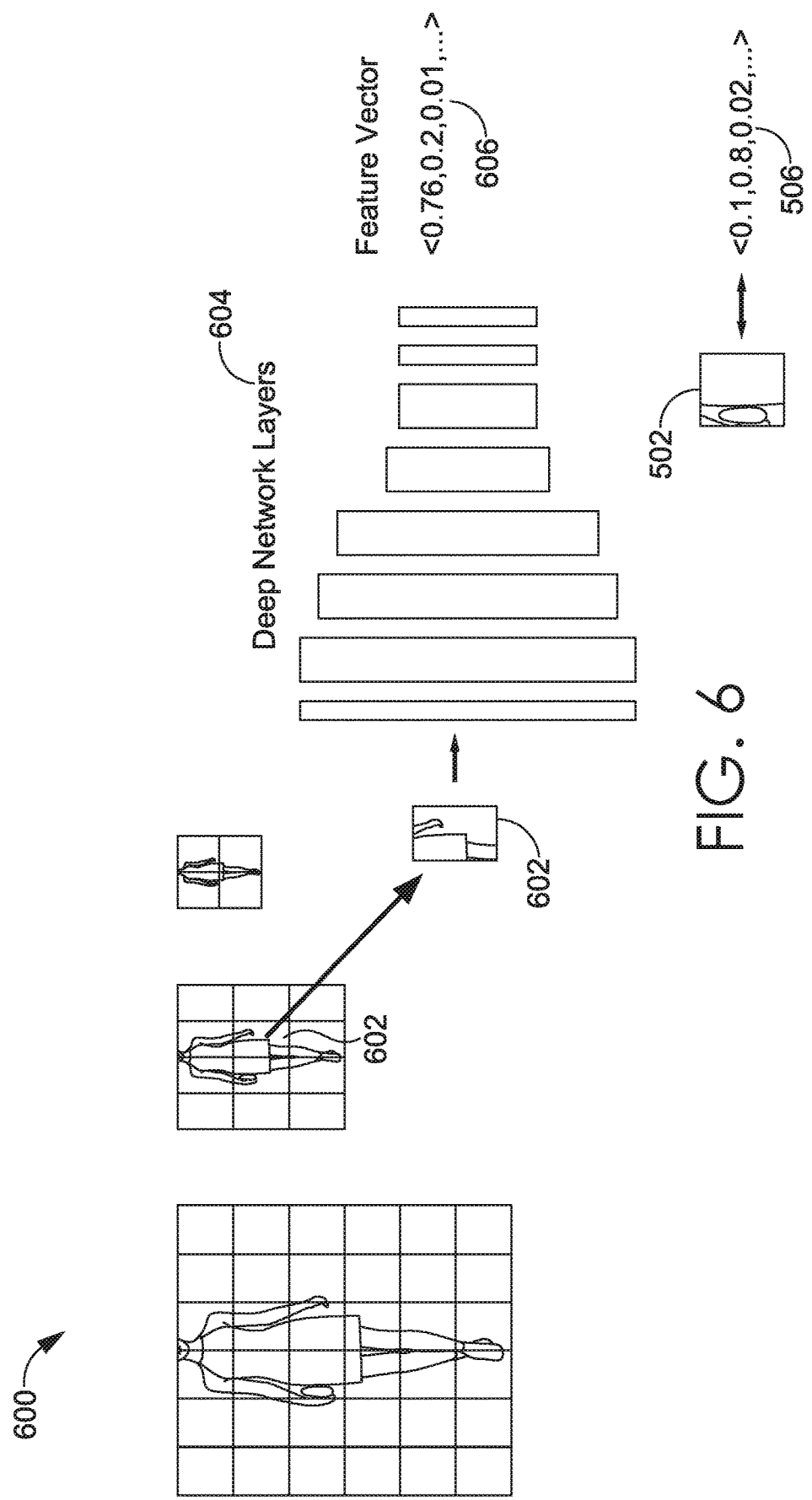
FIG. 6 is a diagram depicting a computation of a feature vector of a tile of a media file, according to one or more embodiments.
Figure 7:
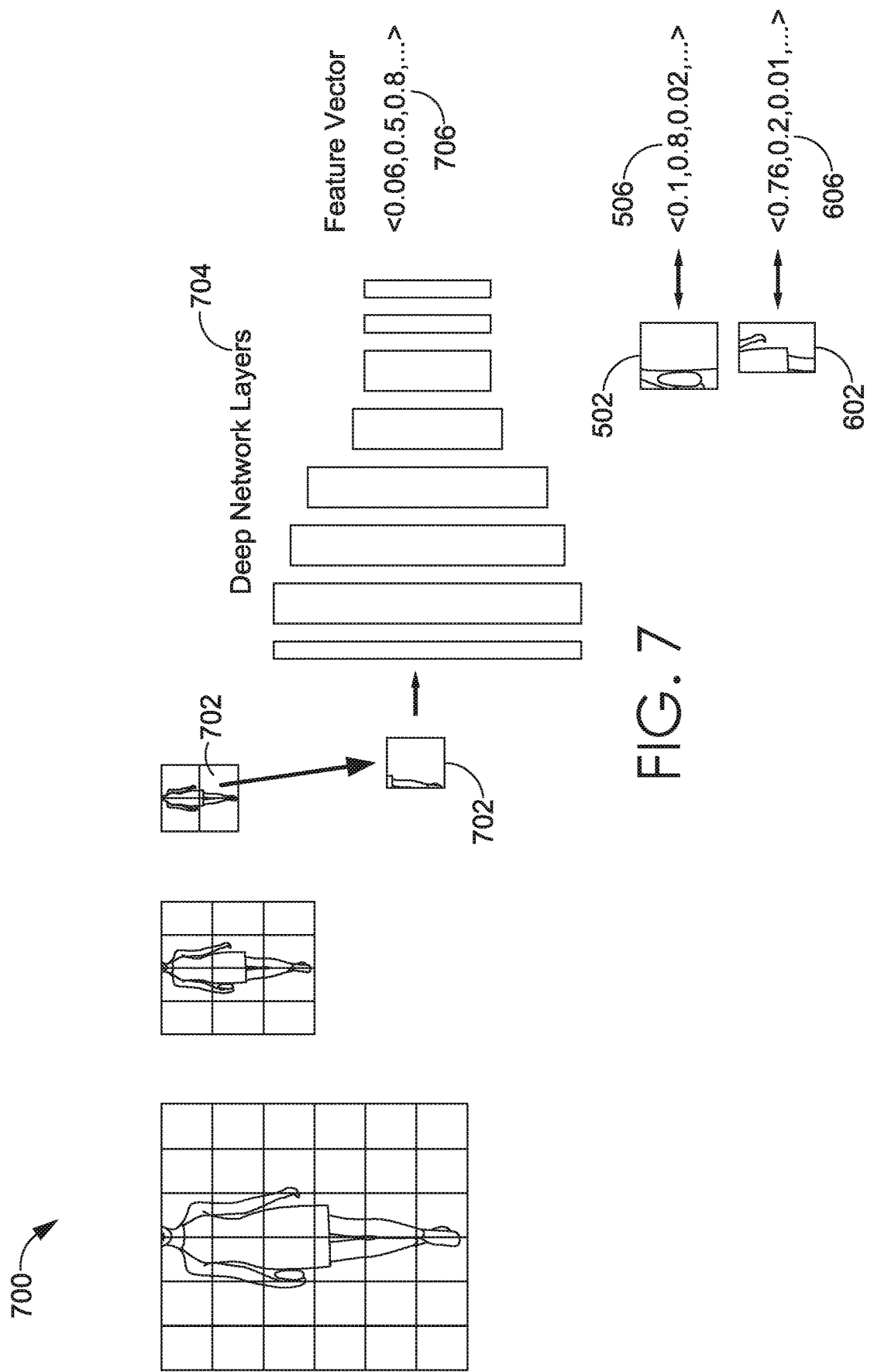
FIG. 7 is a diagram depicting a computation of a feature vector of a tile of a media file, according to one or more embodiments.

FIGS. 5, 6, and 7 depict a computation of a feature vector of a tile, in accordance with embodiments of the present invention. Represented generally by numerals 500, 600, and 700, respectively, FIGS. 5, 6, and 7 illustrate that each tile is processed through deep network layers to compute a feature vector. For instance, in FIG. 5, tile 502 is illustrated as being processed through deep network layers 504 in order to determine that tile's feature vector 506. As shown, a feature vector is a set of numerals, each of which represents a feature of the tile. For instance, a tile having a feature vector of <0.1, 0.8, 0.02, 0.43, 0.97>may provide information regarding one or more objects in the tile, such as color components, length, area, shape description, gradient magnitude, or gradient direction. Other features of the tile may also be represented by a computed feature vector, and are contemplated to be within the scope of aspects herein.

Similarly, FIG. 6 illustrates a tile 602, corresponding to a resolution lower than the resolution corresponding to the tile 502 in FIG. 5, being processed by deep network layers 604 to compute a feature vector 606. The feature vector 506 for tile 502 of FIG. 5 is illustrated as well in FIG. 6. FIG. 7 illustrates a tile 702, corresponding to a resolution lower than the resolution corresponding to the tile 502 in FIG. 5 and also lower than the resolution corresponding to the tile 602 of FIG. 6, being processed by deep network layers 704 to compute a feature vector 706. Tiles 502 and 602 are illustrated in FIG. 7, along with their respective feature vectors, 506 and 606. While in FIGS. 5, 6, and 7 the deep network layers are labeled as items 504, 604, and 704, it is contemplated that the deep network layers utilize the same neural network, such as a deep convolutional neural network. For instance, tiles 502, 602, and 702 may actually be processed through the same deep network layers for computing their individual feature vector.

A clustering element, for example K-means clustering element 120, accesses the feature vectors of each tile and generates patch clusters. Each patch cluster includes tiles having similar feature vectors. The tiles included in a patch cluster may be from different media files or different resolutions. The term "similar feature vectors" indicates a similarity level as desired, i.e. the feature vectors may not be exactly similar but may be similar enough to meet a desired threshold or desired level of similarity. The clustering algorithm used by the clustering element can be fine-tuned to meet the desired level of similarity. The desired level of similarity is a measure of how different one patch cluster is from another patch cluster. Higher the similarity threshold or the desired level of similarity, higher the number of patch clusters is and hence, higher the level of differences, i.e. higher accuracy, in final product groups. For example, if a final product group is desired to include same product of different colors then the similarity threshold can be set low as compared to the similarity threshold when the final product group is desired to include same product with same color. In one embodiment, 150 patch clusters are generated to achieve sufficient accuracy in final product groups.

Figure 8:
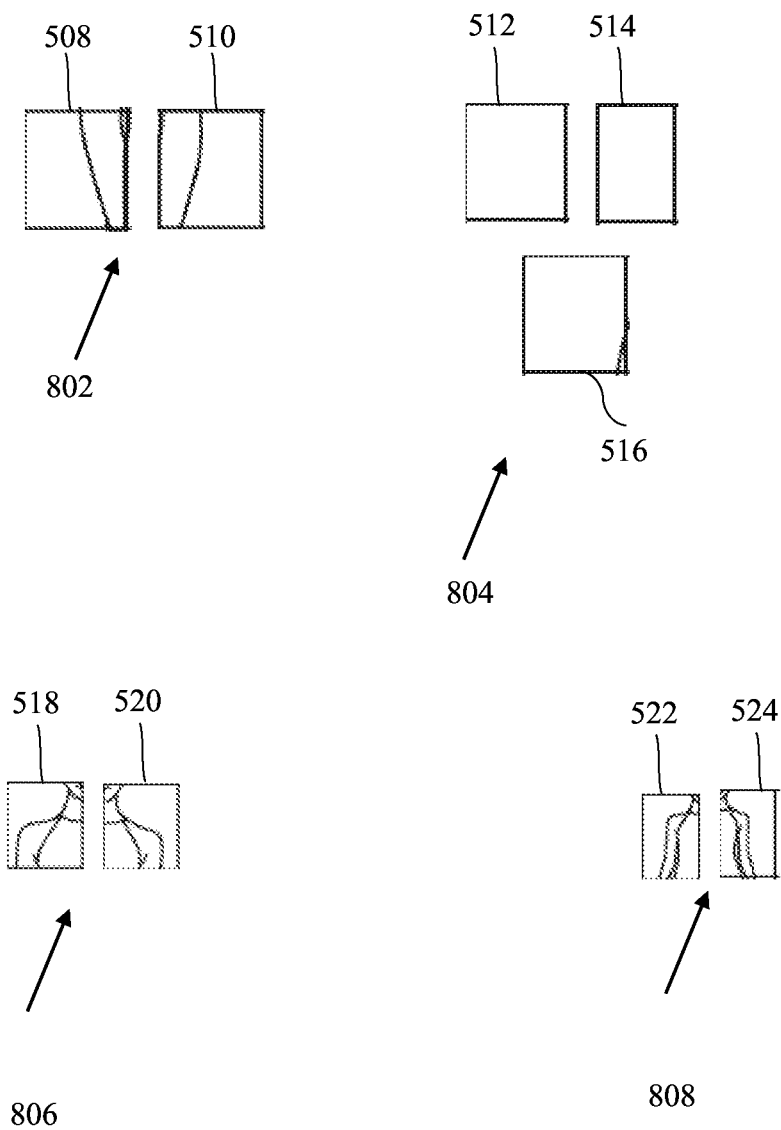
FIG. 8 is a diagram showing patch clusters, according to one or more embodiments.

FIG. 8 shows a patch cluster 802 including tiles 508 and 510 having feature vectors similar to each other, and a patch cluster 804 including tiles 512, 514, 516 (and many more tiles not shown in FIG. 8 but shown in FIG. 5) having feature vectors similar to each other. A patch cluster 806 including tiles 518 and 520, and a patch cluster 808 including tiles 522 and 524 are also shown in FIG. 8. In some embodiments, if a very high accuracy is not needed then tiles 518, 520, 522 and 524 can be included in one single patch cluster.

A K-dimensional array generator 125 then processes the media files and generates one array for each media file. The array is K-dimensional array wherein, K is equal to number of patch clusters. The array has K values, with each value corresponding to one patch cluster. For each media file, the array is generated in the following way, i.e. the ith coordinate of the array=1 if there is some portion of the media file belonging to patch cluster Pi, and ith coordinate of the array=0 otherwise. In some embodiments, instead of having binary values, the array includes non-binary values indicating probability of some portion of the media file belonging to the corresponding patch cluster. In one embodiment, the array is generated by processing each media file through the feature vector generator 115 to compute feature vectors of the media file and then a comparison is performed between feature vectors of each media file and feature vectors for each patch cluster. The feature vectors of a patch cluster is union of the feature vectors of all tiles includes in that patch cluster.

A comparator 130 accesses the arrays and performs a comparison of the arrays of any two media files at a time in one embodiment. The comparator 130 is based on machine learning algorithm. The comparator 130 is pre-trained by providing two media files from a true pair, i.e. the media files that are similar, and the comparator 130 learns how the two media files are similar. Similarly, media files that form a false pair are also provided to the comparator 130. Many such false pairs and true pairs are inputted into the comparator 130 and the comparator 130 learns whether any two arrays are similar or not. A comparison value, i.e. either binary or non-binary, is outputted by the comparator 130 and based on the comparison value an edge is generated between the media files indicating that the arrays are similar. The edges are generated for all pairs of media files. Two arrays are considered to match exactly if a threshold number of values in one array match with all values in another array.

Outliers, such as arrays having all values as zeros or having fewer non-zero values than a pre-defined number, are discarded. For the two arrays to be considered similar, the arrays should have non-zero values for at least a predefined number of patch clusters. An edge indicates the level or extent of similarity between the arrays. In some embodiments, the arrays may not be exactly similar but may have similar values for a threshold number of patch clusters and also for same set of patch clusters. For example, a set of patch clusters can include P1 to P120, P134, and P136 to P150. So, if the values in the array corresponding to the set is same for two arrays then the two arrays are said to be similar and corresponding media files are considered to be belonging to the same set of patch clusters. In other embodiments, other ways of comparison may be used.

A cluster generator 135 then accesses the output of the comparison and clusters the media files that belong to the same set of patch clusters, i.e. the output is similar to each other. All media files having edges between them are clustered into one product group.

In some embodiments, the apparatus 100 also includes a label generator that generates keyword for each patch cluster by processing tiles included in the patch cluster through deep learning technique. The generated keywords are then matched with keywords of products present in shot list. If the keywords match then the keywords are used to label the product group.

At any point, an output of any of the elements of the apparatus 100 described above may be stored in appropriate storage medium. Also, the elements can perform their functionalities in real time, or can perform the functionalities offline and store the pre-computed values in appropriate storage medium.

Figure 2:
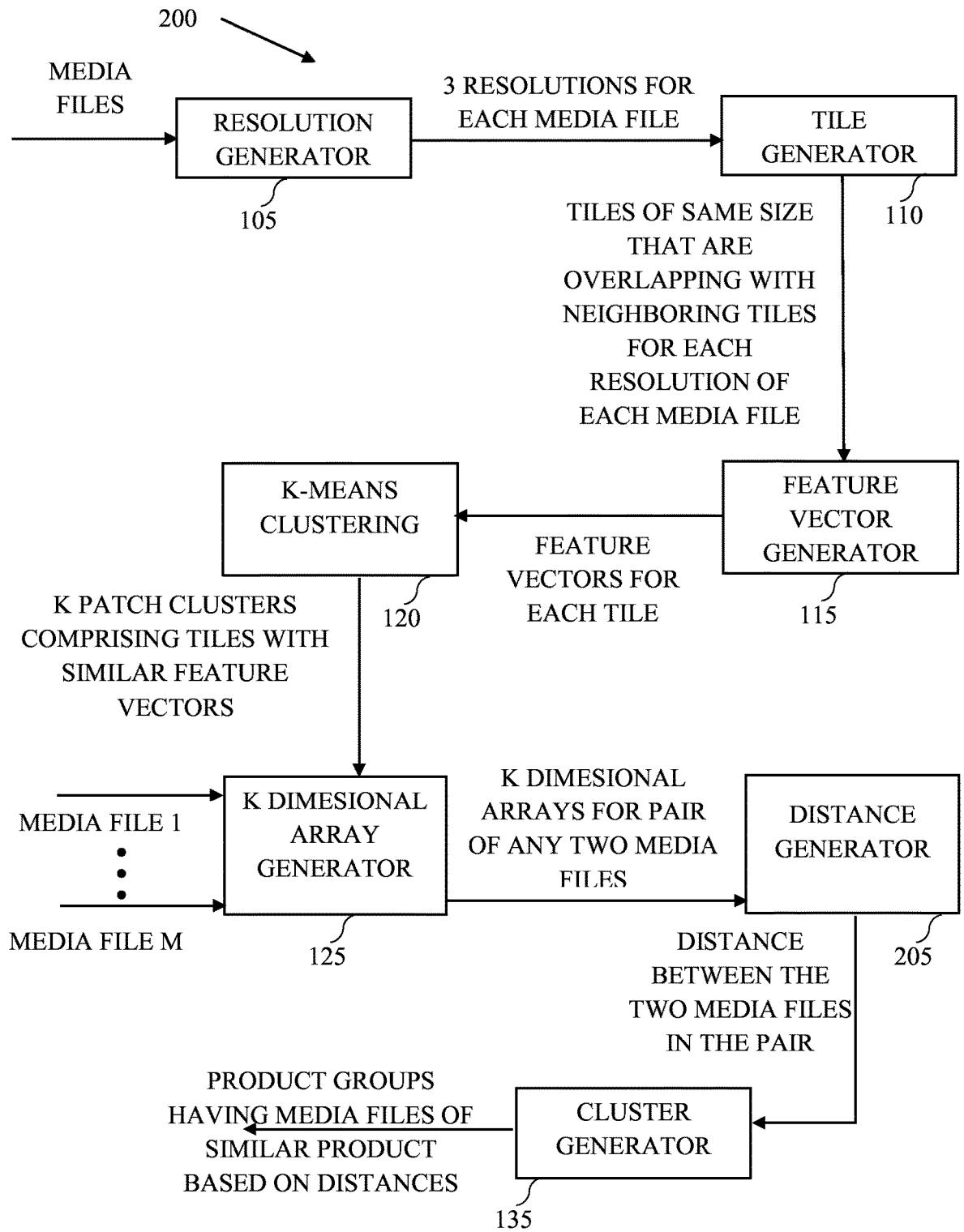
FIG. 2 is a diagram of an apparatus for clustering media files, according to another embodiment.

FIG. 2 is a diagram of an apparatus 200 for clustering media files, according to one or more embodiments. The apparatus 200 is similar to the apparatus 100 except that the apparatus 200 does not include the comparator 130 but instead includes a distance generator 205. The distance generator 205 determines distance between any two media files by determining distance between their respective arrays. Based on the distance the clusters are generated by the cluster generator 135. For example, consider two arrays, Array 1=[D1, D2, . . . Dk] and Array 2=[E1, E2, . . . Ek] where K is the number of patch clusters. The distance is computed between the two arrays using Distance=Sqrt [W1*(D1−E1)^2+ . . . Wk*(Dk−Ek)^2] where Wi is inversely proportional to number of images that contribute to cluster Pi. The weighting ensures that the clusters that represent too many media files, for example a cluster including backgrounds or hands, do not contribute much to the distance. K-means clustering is then applied on the distances between all media file pairs to generate final product groups. Each product group includes all media files corresponding to one product. All media files having similar distances, i.e. similar comparison output, or within a range of similarity are grouped into one product group and considered to be having similar comparison output.

At any point, an output of any of the elements of the apparatus 200 described above may be stored in appropriate storage medium. Also, the elements can perform their functionalities in real time, or can perform the functionalities offline and store the pre-computed values in appropriate storage medium.

In various embodiments, the comparison output includes an indicator indicating that the media files have similar feature vectors to each other for same set of patch clusters, i.e. the media files have similar feature vectors for a product or properties or attributes of product, and hence, the media files correspond to same product. In one embodiment, the indicator is the similarity in the in the arrays, i.e. the values in the arrays are same for same set of patch clusters. Similar arrays indicate that the media files have similar feature vectors for a product or properties or attributes of product, and hence, the media files correspond to same product. In another embodiment, the indicator is the similarity in the distances between the media files, i.e. the K-means clustering algorithm considers the distance to be grouped into same group. Similar distances indicate that the media files have similar feature vectors for a product or properties or attributes of product, and hence, the media files correspond to same product.

The algorithms and procedures for performing various operations of the apparatuses 100 and 200 are now explained in conjunction with example procedures.

Example Procedures

Figure 3:
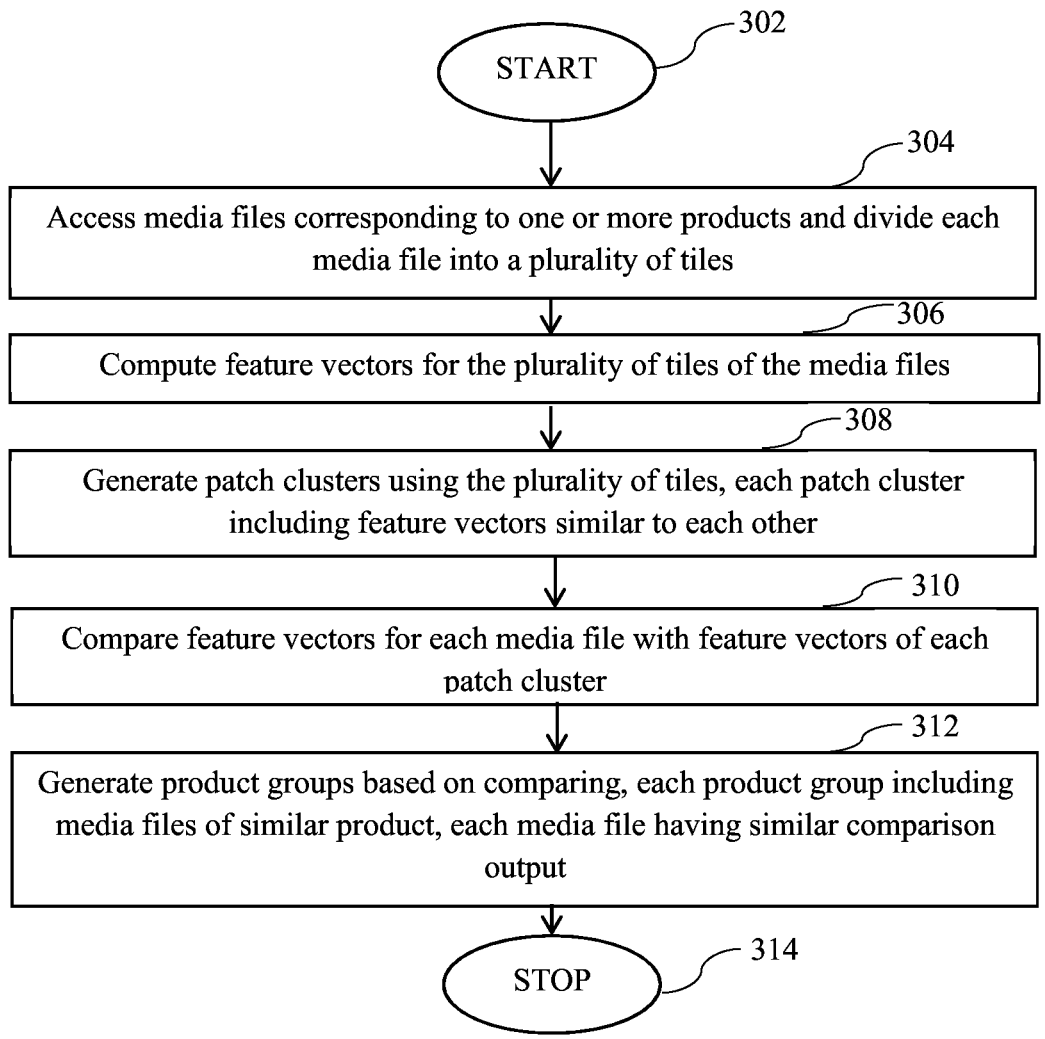
FIG. 3 is a flowchart of a procedure for clustering media files, as performed by the system of FIG. 1 or FIG. 2, according to one or more embodiments.

FIG. 3 is a flowchart of a procedure for clustering media files by an apparatus, such as the apparatus 100 or the apparatus 200, according to one or more embodiments.

The procedure starts at step 302 and proceeds to step 304.

At step 304, media files corresponding to one or more products are accessed. A marketer of a brand desires to provide rich engaging experience to visitors on its website. For providing the rich engaging experience, the marketer creates a product shot list. Photo team accesses the product shot list and creates a photo shoot of the product with different models wearing or using the product. The media files, i.e. at least one of images or videos or both, created as a result of the photo shoot are then uploaded via a portal, such as Adobe Experience Manager portal, provided by the marketer. The media files are stored in a storage medium and are accessed. The media file is first processed using any existing technique to generate different resolutions, i.e. at least three resolutions, of the media file. Each resolution of the media file is then divided into a plurality of tiles using any existing technique. The tiles are, typically, of same size with neighboring tiles overlapping each other. The tiles indicate a smaller portion of the media file.

At step 306, feature vectors are computed for the plurality of tiles of each media file. In case media file is an image then entire image is processed. In case media file is a video then frame wise processing of the video is performed. Each tile is then processed through a deep learning algorithm. The deep learning technique is a machine learning technique performed using a neural network, such as a deep convolutional neural network (network) that has been pre-trained on a large class of media files. The network is used to obtain feature vectors representing content of each tile through, in one embodiment, the response of the fully connected layer two levels below the final Softmax classification layer. In one embodiment, a Softmax function is applied to the network for classification, and such determines whether the output of the network indicates that a particular tile being evaluated has certain features.

At step 308, patch clusters are generated by processing each tile. Feature vectors of each tile is compared with feature vectors of other tiles. All tiles having similar feature vectors or substantially similar feature vectors or having at least a desired or minimum lever of similarity in the feature vectors are grouped into one patch cluster. The tiles of a patch cluster can include tiles from different images or different resolutions. In one embodiment, K-means clustering technique is used to generate the patch clusters. The feature vectors are provided as an input to the K-means clustering technique and the patch clusters including the tiles with similar feature vectors are obtained as the output. The number of patch clusters that are to be generated can be controlled and is a function of the level of accuracy desired by the marketer in final product groups. Higher the number of patch clusters, more granular the level of things or properties or attributes of the products that can be differentiated between the media files and hence, higher the accuracy of the final product groups.

At step 310, feature vectors of each media file is compared with feature vectors of each patch cluster. The feature vectors of a patch cluster is union of the feature vectors of each tile included in the feature vector. In one embodiment, the feature vectors of the media files are computed by processing each media file through the same deep learning technique and then comparing the feature vectors of each media file with each patch cluster. In another embodiments, the comparison is performed by comparing feature vectors of each tile of the media file with each tile of the patch cluster to determine if any tile of the media file is present in or is belonging to or is contributing to corresponding patch cluster. The comparing includes generating an array for each media file. The array has K entries or values, where K is the number of patch clusters. Each value in an array corresponds to one patch cluster and hence, the array has K values. The values can be binary or non-binary, and each value Vi corresponding to a patch cluster Pi indicates the probability of the media file belonging to the patch cluster Pi, i.e. the probability of the medial file having at least some feature vectors similar to the feature vectors of the patch cluster. The probability is high if the media file includes same product, or attributes or properties of product as that present in the patch cluster.

At step 312, product groups are generated based on comparison. Each product group corresponds to one product and include media files having similar comparison output, i.e. the media files having similar arrays. An array has K values where K is number of patch clusters and the values of the arrays are represented as Vi, where i ranges from 1 to K. For example, an array=[V1, V2 . . . Vi, . . . Vk] has value V1 corresponding to patch cluster P1, and has value Vk corresponding to patch cluster Pk. Vi indicates the probability of the media file belonging to the patch cluster Pi, i.e. the media file having feature vectors similar to the feature vectors of the patch cluster. Two arrays are said to be similar if the value Vi is same for the two arrays for same set of patch clusters, i.e. for same range of i. For example, if two arrays have same values for patch clusters P1 to P10, and P25-P150 where K=150 then the arrays are said to be similar or corresponding media files are said to be belonging to same set of patch clusters. In illustrated example, the same set of patch clusters include P1 to P10 and P25-P150. In some embodiments, if the arrays have similar values for at least a minimum number of patch clusters and same set of patch clusters then the arrays are considered to be similar. The minimum number ensures that if two arrays have similar values only for the patch clusters that correspond to background then such arrays get discarded as such arrays may differ in terms of product they include and hence, are likely to give false results. For example, if array 1=[0, 0.3, 0, 0.4, 0, 0.5, 1] and array 2=[0, 0.3, 0, 0.3, 0, 0.5, 1] then the arrays are considered similar. However, the arrays array 1=[0, 0, 0, 1, 0, 0, 0, 0, 0] and array 2=[0, 0, 0, 1, 1, 0, 0, 0, 0] may not be considered similar. Similarly, other false hit scenarios, for example array with all zero values etc. are also discarded or are not considered similar.

In one embodiment, the arrays are compared using a machine learning algorithm. A pre-trained classifier is used for comparing two arrays. The pre-trained classifier is trained by providing arrays for several true pairs, i.e. pair having similar media files, and also, for several false pairs, i.e. pair having different media files. The pre-trained classifier learns to provide an output of 0 if the arrays, i.e. media files, are different, and an output of 1 if the arrays, i.e. media files, are same. Any new media files pair, i.e. arrays, can then be provided to the pre-trained classifier to obtain similarity output. In some embodiments, the pre-trained classifier can be trained to provide a non-binary value too. Based on the output of the pre-trained classifier edges are generated between each pair of the media files. Edges are generated between those media files that have similar arrays. Finally, all media files having edges, i.e. similar arrays or belonging to same set of patch clusters, are grouped into one product group. Several such product groups are generated, with each product group corresponding to one product and having all media files corresponding to the product. In some embodiments, the pre-trained classifier can be trained for differentiating some specific outliers and providing high accuracy on certain specific aspects such as orientation, angle etc.

In another embodiment, the arrays are compared by determining distance between two arrays. For each value $V_i$ of the array, a distance between the values is determined and then it is multiplied by weight that is inversely proportional to number of media files contributing to the patch cluster $P_i$ corresponding to the value $V_i$. The weights can also be learnt by the distance generator 205 which can be based on machine learning algorithm. The distance generator 205 is pre-trained by providing two media files from a true pair, i.e. the media files that are similar, and the distance generator 205 learns how the two media files are similar. Similarly, media files that form a false pair are also provided to the distance generator 205. Many such false pairs and true pairs are inputted into the distance generator 205 and the distance generator 205 learns which weight to assign. The overall distance between two arrays, $A1=[D1, D2, \ldots Dk]$ and $A2=[E1, E2, \ldots Ek]$, is determined as D=Square root of $[W1*(D1-E1)^2+ \ldots Wk*(Dk-Ek)^2]$ where $W_i$ is inversely proportional to number of media files in patch cluster $P_i$. The weighing ensures that the patch clusters that include too many media files that correspond to background or hands or other noisy stuff do not contribute much to the distance. The distances are then processed using the K-means algorithm to generate final product groups, where each product group corresponds to one product and includes media files that include that product, i.e. the media files having similar distances. The media files having similar distances indicate that the media files belong to same set of patch clusters because if the $V_i$ corresponding to $P_i$ is different for the two media files then they may not have similar distances.

In various embodiments, the comparison output includes an indicator indicating that the media files have similar feature vectors to each other for same set of patch clusters, i.e. the media files have similar feature vectors for a product or properties or attributes of product, and hence, the media files correspond to same product. In one embodiment, the indicator is the similarity in the in the arrays, i.e. the values in the arrays are same for same set of patch clusters. Similar arrays indicate that the media files have similar feature vectors for a product or properties or attributes of product, and hence, the media files correspond to same product. In another embodiment, the indicator is the similarity in the distances between the media files, i.e. the K-means clustering algorithm considers the distance to be grouped into same group. Similar distances indicate that the media files have similar feature vectors for a product or properties or attributes of product, and hence, the media files correspond to same product.

In addition, in some embodiments, when each media file is processed through deep learning technique keywords or labels for each media file are stored. The keywords are obtained as an output of one or more stages of the deep learning algorithm. In some embodiments, keywords for each tile are generated and stored. The patch cluster includes multiple tiles and the keywords for the patch cluster are generated by taking a union of keywords of all tiles included in the patch cluster. The keywords for a product group are then generated by either using the keywords of the media files included in the product group or using the keywords of the patch cluster contributing to the product group. The keywords for the product group are then matched with the keywords of corresponding product in the shot list. The keywords that match are provided as a recommendation to the marketer for the product group with some probable scores that are calculated using existing techniques.

Example Environment

Figure 9:
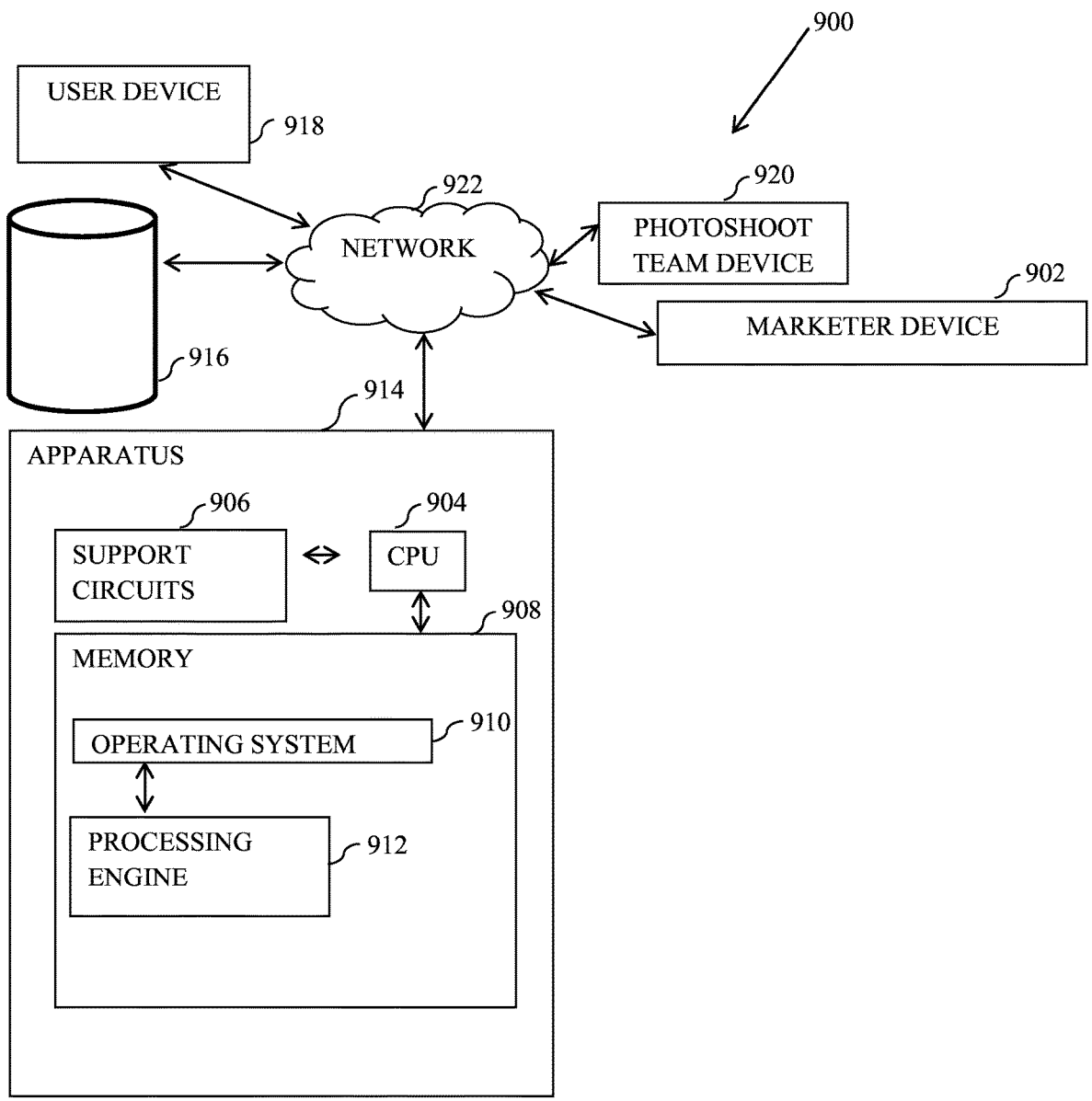
FIG. 9 is an environment for clustering media files, according to one or more embodiments.

FIG. 9 is a diagram of an environment 900 for clustering media files, according to one or more embodiments. The environment 900 includes one or more user devices, such as a user device 918, and one or more photo shoot team devices such a photo shoot team device 920. The user devices can communicate with an apparatus 914 (example includes the apparatus 100 or the apparatus 200) via a network 922. The environment 900 also includes one or more marketer/brand devices, such as a marketer device 902. The marketer devices can communicate with the apparatus 914 directly or via a website of the brand of the marketer, the website being powered by the apparatus 914. The environment 900 also includes a storage device or medium 916 accessible via the network 922, or directly by the apparatus 914.

Hardware Description

Examples of the apparatus 914 include, but are not limited to, a desktop computer, server, a combination of one or more servers, or any other electronic device having one or more processors. The apparatus 914 can be present at one single location or can be present at different locations in a distributed environment.

The apparatus 914 includes a Central Processing Unit (CPU) 904, support circuits 906, and a memory 908. The CPU 904 may include one or more commercially available microprocessors or microcontrollers that facilitate data processing and storage. The various support circuits 906 facilitate the operation of the CPU 904 and include one or more clock circuits, power supplies, cache, input/output circuits, and the like. The memory 908 may include at least one of Read Only Memory (ROM), Random Access Memory (RAM), disk drive storage, optical storage, removable storage or the like. The memory 908 includes an operating system 910, and a processing engine 912. The operating system 910 may include various commercially known operating systems.

The apparatus 914 may further include one or more input devices (not shown in FIG. 9) connected to the apparatus 914. Examples of the one or more input devices include, but are not limited to, peripheral devices, keyboard, mouse etc. In some embodiments, the apparatus 914 may not be connected to the input devices separately and may have functionalities of these input devices built into the apparatus 914, such as in cases in which the apparatus 914 is touch enabled device, gesture enabled device, or paired to such similar devices that act as the input devices. The processing engine 912 includes various other engines to perform procedures as described herein. Various other engines included in the processing engine 912 includes the elements or the engines shown in FIG. 1 or FIG. 2.

The storage device 916 is, for example, a storage drive or a storage system, or a distributed or shared storage system. In some embodiments, the storage device 916 is coupled to a processing device (not shown) to facilitate extraction or retrieval or access of data stored in the storage device 916, or is directly accessible by the apparatus 914.

Examples of the user devices include, but are not limited to, a desktop computer, a smartphone, a tablet computer, a laptop computer, a mobile computer or any other electronic device having one or more processors. Each user device includes a Central Processing Unit (CPU), support circuits, and a memory. The CPU may include one or more commercially available microprocessors or microcontrollers that facilitate data processing and storage. The various support circuits facilitate the operation of the CPU and include one or more clock circuits, power supplies, cache, input/output circuits, and the like. The memory may include at least one of Read Only Memory (ROM), Random Access Memory (RAM), disk drive storage, optical storage, removable storage or the like. The memory includes an operating system, and a browsing system. The operating system may include various commercially known operating systems. Each user device may further include one or more input devices connected to the corresponding user device. Examples of the one or more input devices include, but are not limited to, peripheral devices, keyboard, mouse etc. In some embodiments, the user device may not be connected to the input devices separately and may have functionalities of these input devices built into the user device, such as in cases in which the user device is touch enabled device, gesture enabled device, or paired to such similar devices that act as the input devices.

Examples of the network 922 include, but are not limited to, internet, local area network (LAN), wireless area network, wired area network etc.

Examples of the marketer devices include, but are not limited to, a desktop computer, a smartphone, a tablet computer, a laptop computer, a mobile computer or any other electronic device having one or more processors. The marketer device 902 includes a Central Processing Unit (CPU), support circuits, and a memory. The CPU may include one or more commercially available microprocessors or microcontrollers that facilitate data processing and storage. The various support circuits facilitate the operation of the CPU and include one or more clock circuits, power supplies, cache, input/output circuits, and the like. The memory may include at least one of Read Only Memory (ROM), Random Access Memory (RAM), disk drive storage, optical storage, removable storage or the like. The memory includes an operating system, and a browsing system. The operating system may include various commercially known operating systems. The marketer device 902 may further include one or more input devices connected to the marketer device 902. Examples of the one or more input devices include, but are not limited to, peripheral devices, keyboard, mouse etc. In some embodiments, the marketer device 902 may not be connected to the input devices separately and may have functionalities of these input devices built into the marketer device 902, such as in cases in which the marketer device 902 is touch enabled device, gesture enabled device, or paired to such similar devices that act as the input devices.

Functional Description

The functional working of the environment 900 is now explained.

A company of the marketer has a website powered by the apparatus 914. The user visits the website using the user device 918. The marketer desires the user to have rich engaging experience with products shown on the website. The marketer creates a product shot list using the marketer device 902 and stores the shot list in the storage device 916. The photo shoot team accesses the shot list using the photo shoot team device 920. The photo shoot team then conducts the photo shoot and uploads media files on to the storage device 916 via a portal exposed by the marketer using services of the apparatus 914. The apparatus then accesses the media files uploaded by the photo shoot team and processes the media files as described in FIG. 1 or FIG. 2. The product groups and the labels for each product group are then generated by the apparatus 914 automatically and provided for publishing on the website.

The embodiments of the present invention may be embodied as procedures, apparatus, electronic devices, and/or non-transient or non-transitory computer program products or computer readable medium. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable medium having computer-usable or computer-readable program code embodied in the non-transient or non-transitory medium for use by or in connection with an instruction execution apparatus. In the context of this document, a computer-usable or computer-readable medium may be any medium that can contain, store, communicate, propagate, or transport the program for use by or in connection with the instruction execution apparatus, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

Examples of the computer-usable or computer-readable medium include, but are not limited to, an electronic, magnetic, optical, electromagnetic, infrared, or semiconductor apparatus, apparatus, device, or propagation medium. More specific examples (a non-exhaustive list) of the computer-readable medium or non-transient computer-readable medium or non-transitory computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like or in scripting language, such as Perl, Python, PHP, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The procedures described herein may be implemented in software, hardware, or a combination thereof, in different embodiments. In addition, the order of procedures may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance.

In the foregoing detailed description, numerous specific details are set forth to provide a thorough understanding of claimed subject matter. However, it will be understood by those skilled in the art that claimed subject matter may be practiced without these specific details. For example, the claimed subject matter may be practiced by using different gestures or icons than that described. In other instances, procedures or apparatuses that would be known by one of ordinary skill have not been described in detail so as not to obscure claimed subject matter.

Some portions of the detailed description are presented in terms of algorithms or symbolic representations of operations on binary digital signals stored within a memory of a specific apparatus or specific electronic device or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Unless specifically stated otherwise, as apparent from the following discussion, it is appreciated that throughout this specification discussions utilizing terms such as "processing," "displaying," "receiving," "providing" or the like refer to actions or processes of a specific apparatus, such as a special purpose computer or a similar special purpose electronic device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic device.

Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A computer-implemented method for clustering product media files comprising:
   identifying a plurality of media files corresponding to one or more products;
   generating media file feature vectors for each media file of the plurality of media files;
   dividing each media file of the plurality of media files into a plurality of image tiles;
   generating an image tile feature vector for each image tile of each of the plurality of image tiles;
   generating patch clusters by clustering image tiles having similar image tile feature vectors into a patch cluster;
   generating a union of the image tile feature vectors of the image tiles in each patch cluster;
   determining a correspondence between media files of the plurality of media files and the patch clusters by comparing the union of the image tile feature vectors of each patch cluster with the media file feature vectors of each media file; and
   generating a product group by clustering one or more media files of the plurality of media files, which have similar correspondences to a target patch cluster of the generated patch clusters, to the product group.

2. The method of claim 1, further comprising generating the media file feature vectors for the plurality of media files and the image tile feature vectors utilizing a common machine-learning feature vector generator.

3. The method of claim 1, wherein:
   the plurality of media files comprise images; and
   generating the image tile feature vector for each image tile of each of the plurality of image tiles comprises:
      generating a plurality of resolutions of each of the images; and
      dividing each resolution of each of the images into image tiles.

4. The method of claim 1, wherein:
   the plurality of media files comprise videos, and
   generating the image tile feature vector for each image tile of each of the plurality of image tiles comprises:
      accessing a frame of a video of the videos;
      generating a plurality of resolutions of the frame; and
      dividing each resolution of each frame into the plurality of image tiles for the video.

5. The method of claim 1, wherein dividing each media file of the plurality of media files into the plurality of image tiles comprises dividing each image tile of each of the plurality of image tiles into a same size and with neighboring image tiles.

6. The method of claim 1, wherein comparing the media file feature vectors of each media file of the plurality of media files with the image tile feature vectors of the patch clusters comprises generating an array for each media file, the array comprising multiple probability values for the media file where each probability value corresponds to the target patch cluster and indicates a probability that the media file has feature vectors similar to the feature vectors of the target patch cluster.

7. The method of claim 6, wherein the array is a K-dimensional array equal to a number of patch clusters.

8. The method of claim 1, wherein generating the product group comprises:
 comparing an array of a first media file to an array of a second media file; and
 clustering the first media file and the second media file into the product group based on determining similarities from the comparison to the target patch cluster.

9. The method of claim 1, further comprising:
 utilizing a deep learning technique to generate one or more keywords for the product group based on the one or more media files clustered in the product group; and
 labeling the product group with one or more of the keywords if the one or more keywords match keywords present in a list of products keywords.

10. A non-transitory computer-readable medium storing computer instructions that when executed by at least one processor causes the at least one processor to:
 identify a plurality of media files corresponding to one or more products;
 generate media file feature vectors for each media file of the plurality of media files;
 divide each media file of the plurality of media files into a plurality of image tiles;
 generate an image tile feature vector for each image tile of each of the plurality of image tiles;
 generate patch clusters by clustering image tiles having similar image tile feature vectors into a patch cluster;
 generate a union of the image tile feature vectors of the image tiles in each patch cluster;
 determine a plurality of probabilities that each of media files of the plurality of media files corresponds to each of the patch clusters by comparing the union of the image tile feature vectors of each patch cluster with the media file feature vectors of each media file; and
 based on determining that one or more media files belong to a target patch cluster of the generated patch clusters, cluster the one or more media files into a product group.

11. The non-transitory computer-readable medium of claim 10, further comprising instructions that when executed by at least one processor causes the at least one processor to:
 generate, for a target media file of the plurality of media files, an array that indicates the plurality of probabilities that the target media file correspond to each of the patch clusters; and
 determine that a first media file corresponds to a second media file based on matching values from a first array correspond to the first media file with a second array corresponding to a second media file.

12. The non-transitory computer-readable medium of claim 11, wherein:
 the plurality of media files comprise images; and
 generating the image tile feature vector for each image tile of the plurality of image tiles comprises:
  generating a plurality of resolutions of each of the images; and
  dividing each resolution of each of the images into image tiles.

13. The non-transitory computer-readable medium of claim 11,
 wherein:
 the plurality of media files comprise videos, and
 generating the image tile feature vector for each image tile of the plurality of image tiles comprises:
  accessing a frame of a video of the videos;
  generating a plurality of resolutions of the frame; and
  dividing each resolution of each frame into the plurality of image tiles for the video.

14. The non-transitory computer-readable medium as recited by claim 10, wherein comparing feature vectors comparing the media file feature vectors of the plurality of media files with the image tile feature vectors of the patch clusters comprises generating an array for each media file, the array comprising multiple probability values for the media file where each probability value corresponds to the target patch cluster and indicates a probability that the media file has feature vectors similar to the feature vectors of the target patch cluster.

15. The non-transitory computer-readable medium as recited by claim 10, wherein clustering the media files plurality of media files comprises clustering media files having similar arrays into a product group, wherein the similar arrays indicate that the media files correspond to a same set of patch clusters.

16. The non-transitory computer-readable medium as recited by claim 10 and further comprising:
 utilizing a deep learning technique to generate one or more keywords for the product group based on the one or more media files clustered in the product group; and
 labeling the product group with one or more of the keywords if the one or more keywords match keywords present in a list of products keywords.

17. A system comprising:
 one or more memory devices comprising media files corresponding to one or more products; and
 one or more server devices configured to cause the system to:
  identify a plurality of media files corresponding to one or more products;
  divide each media file of the plurality of media files into a plurality of image tiles, wherein each image tile of the plurality of image tiles is of a similar size and overlaps with neighboring image tiles;
  generate an image tile feature vector for each image tile of the plurality of image tiles using a feature vector generator neural network;
  generate one or more patch clusters using the plurality of image tiles by clustering image tiles having similar feature vectors into a patch cluster;
  generate media file feature vectors for each media file of the plurality of media files using the feature vector generator neural network;
  generate a union of the image tile feature vectors of the image tiles in each patch cluster;
  determine a correspondence between the media files and the patch clusters by comparing the union of the image tile feature vectors of each patch cluster with the media file feature vectors of each media file; and generate a product group by clustering one or more files of the plurality of media files, which have similar correspondences to a target patch cluster of the one or more generated patch clusters, to the product group.

18. The system as of claim 17, wherein the one or more server devices are configured to cause the system to generate the media file feature vectors for the plurality of media files and the image tile feature vectors utilizing a common machine-learning feature vector generator.

19. The system as recited by claim 17, wherein the one or more server devices are configured to cause the system to compare the media file feature vectors of the plurality of media files with image tile feature vectors of each patch cluster by:

generating an array for each media file comprising multiple probability values for the media file where each probability value corresponds to the target patch cluster and indicates a probability that the media file has feature vectors similar to the feature vectors of the target patch cluster.

20. The system as recited by claim 17, the one or more server devices are configured to cause the system to:

utilizing a deep learning technique to generate one or more keywords for the product group based on the one or more media files clustered in the product group; and labeling the product group with one or more of the keywords if the one or more keywords match keywords present in a list of products keywords.

* * * * *